United States Patent
Kawasato

(10) Patent No.: US 8,934,123 B2
(45) Date of Patent: Jan. 13, 2015

(54) IMAGE FORMING SYSTEM AND SERVER APPARATUS

(71) Applicant: Sharp Kabushiki Kaisha, Osaka (JP)

(72) Inventor: Takayuki Kawasato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 153 days.

(21) Appl. No.: 13/678,740

(22) Filed: Nov. 16, 2012

(65) Prior Publication Data

US 2013/0135670 A1    May 30, 2013

(30) Foreign Application Priority Data

Nov. 24, 2011  (JP) ................................. 2011-255692

(51) Int. Cl.
*G06F 3/12*    (2006.01)
*G06K 15/02*   (2006.01)
*G06K 15/00*   (2006.01)

(52) U.S. Cl.
CPC ............ *G06K 15/02* (2013.01); *G06K 15/1805* (2013.01); *G06K 15/406* (2013.01); *G06F 3/1221* (2013.01); *G06F 3/1229* (2013.01); *G06F 3/1288* (2013.01); *Y02B 60/1267* (2013.01); *Y02B 60/1271* (2013.01)
USPC ....................................................... 358/1.15

(58) Field of Classification Search
None
See application file for complete search history.

(56) References Cited

FOREIGN PATENT DOCUMENTS

| JP | 2001-14123 |   | 1/2001 |
| JP | 2003-108342 | A | 4/2003 |
| JP | 2004-118231 |   | 4/2004 |
| JP | 2006-347112 | A | 12/2006 |
| JP | 2007-206979 |   | 8/2007 |
| JP | 2008-97375 |   | 4/2008 |
| JP | 2008-217539 |   | 9/2008 |
| JP | 2009-055716 | A | 3/2009 |

OTHER PUBLICATIONS

Machine translation for JP 2009-055716.*

* cited by examiner

*Primary Examiner* — Saeid Ebrahimi Dehkordy
*Assistant Examiner* — Lennin Rodriguezgonzale
(74) *Attorney, Agent, or Firm* — Renner, Otto, Boisselle & Sklar, LLP

(57) ABSTRACT

An image forming system includes: an MFP switchable between a standby state and a power-saving state; a plurality of client computers outputting a print instruction to the MFP; and a server computer managing the MFP and the client computers. To the plurality of client computers, schedule information is input by the users of respective client computers. The server computer obtains the schedule information from the client computers and analyzes the schedule information. Based on the information resulting from the analysis, the server computer outputs an instruction to switch the MFP from the standby state to the power-saving state, to the MFP.

5 Claims, 16 Drawing Sheets

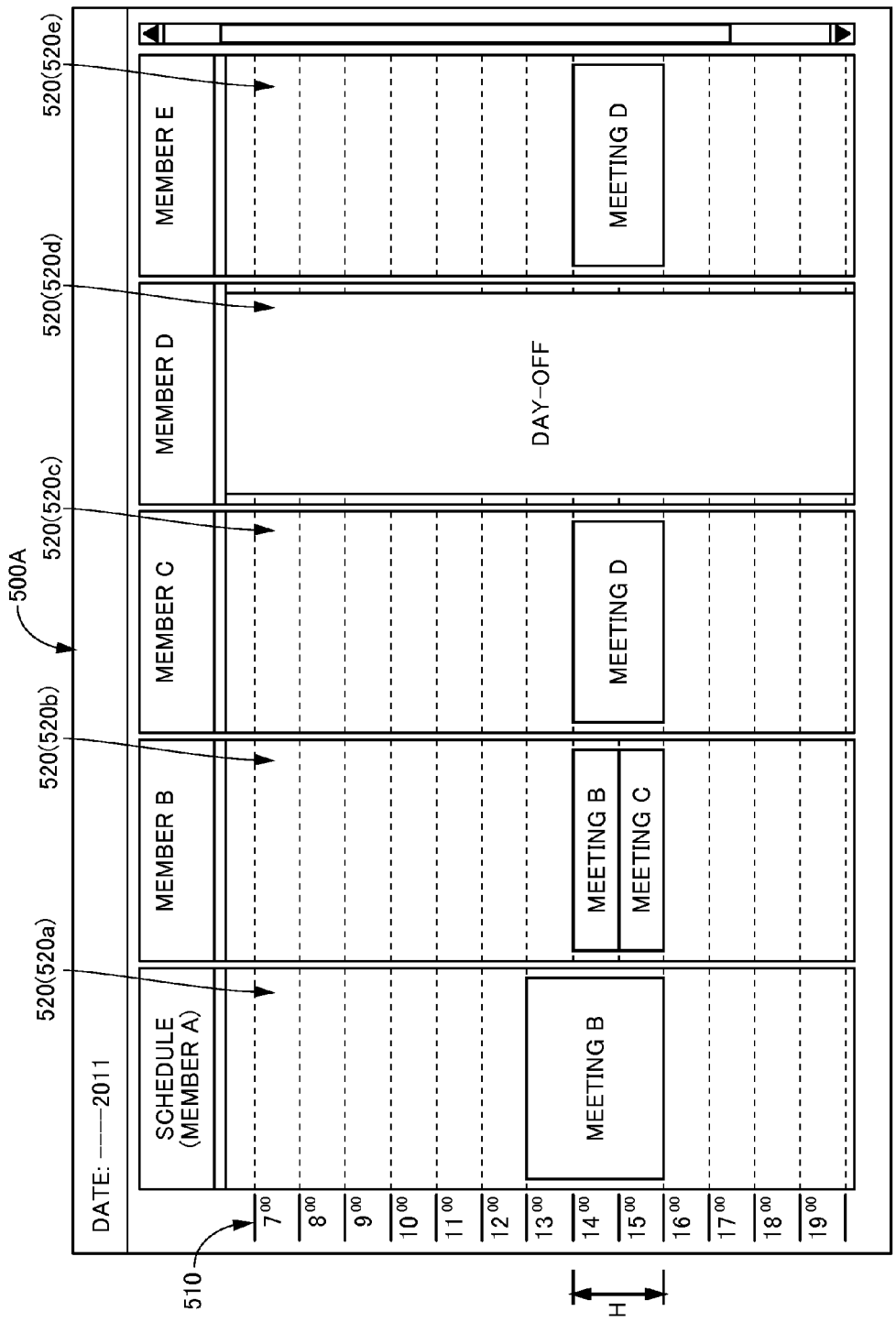

IMAGE FORMING SYSTEM AND SERVER APPARATUS

CROSS-REFERENCE TO RELATED APPLICATIONS

This nonprovisional application claims priority under 35 U.S.C. §119(a) on Patent Application No. 2011-255692 filed in Japan on Nov. 24, 2011, the entire contents of which are hereby incorporated by reference.

BACKGROUND OF THE INVENTION

1. Field of the Invention

The present invention relates to an image forming apparatus of which state of operation can be switched between a standby state and a power-saving state, an image forming system including the image forming apparatus, and a server apparatus managing the image forming apparatus.

2. Description of the Background Art

Recently, as one type of information processing apparatuses, an image forming apparatus (typically a copy machine) has been introduced to many places of business (companies and offices). In such a place of business, it is becoming a common practice to have an image forming apparatus having a printer function or copy function connected to a network and to share the apparatus by a plurality of users. Further, image forming apparatuses having a plurality of operational modes including a copy mode, an image communication mode (typically a facsimile mode), a network compatible printer mode and a scanner mode, such as an MFP (Multi-Function Peripheral), are increasing in number.

Japanese Patent Laying-Open No. 2006-347112 (hereinafter referred to as '112 Reference) discloses an image forming system having an image forming apparatus and a host computer (information processing apparatus) connected through a network. To the image forming system, an authentication server computer, an entering card reader and a leaving card reader are further connected through the network. The entering card reader and the leaving card reader are readers for reading a card to lock or unlock electronic auto-lock when a user enters and leaves a room where the image forming apparatus is placed. Since the operations of these card readers are linked to the authentication server computer and the image forming apparatus, it is possible to determine whether the user who has input a print job is present or absent in a prescribed space, for example, the room where the image forming apparatus is installed. Therefore, a problem that an output sheet is left unattended on a discharge tray when the user who input the print job is absent, for example, when he/she has left the room to attend a meeting or the like, can be prevented.

If an image forming apparatus is shared by a plurality of users, print request timing may differ person by person and, therefore, it is a common practice that the image forming apparatus is kept on for a long time. Therefore, there is a need for reducing power consumption. Particularly in the case of an MFP (Multi-Functional Peripheral) having a plurality of modes such as copy function and facsimile function, it is often the case that the main power is kept on for days, including night time and holidays and, hence, the need for reducing power consumption is increasing.

In view of the foregoing, in an MFP, a prescribed time period after completion of a print output such as copying, or in the absence of any key operation on an operation panel for a prescribed time period, automatic transition takes place from a standby mode (standby state) as a normal power conduction state to a power-saving mode (power-saving state), in which power is turned off or power supply to an unused unit or units (also referred to as module or modules) is suspended. This reduces power consumption.

In these days, if it is known in advance that an image forming apparatus will not be used for some time, it is possible for the user to shut-off the image forming apparatus or to switch the image forming apparatus from the standby mode to the power-saving mode, by operating a so-called power-save switch.

Further, recent image forming apparatuses come to have an operation schedule management function. In accordance with the schedule, the apparatus is automatically switched from the power ON state to the standby mode, or from the standby mode to the power-saving mode, in predetermined time slots.

As described above, techniques for reducing power consumption have been introduced to image forming apparatuses to enable power-saving. In view of power supply situations of late, however, further reduction of power consumption is desirable. Though security can be enhanced by the image forming system of '112 Reference, power-saving of the image forming apparatus is not at all considered. Therefore, it is difficult to meet the demand for further reducing power consumption.

SUMMARY OF THE INVENTION

Therefore, it is desirable to provide an image forming system, server apparatus and image forming apparatus that can further reduce power consumption.

According to a first aspect, the present invention provides an image forming system, including: an image forming apparatus switchable between a standby state and a power-saving state; an information processing apparatus outputting a print instruction to the image forming apparatus; and a server apparatus managing the image forming apparatus and the information processing apparatus. In the image forming system, the information processing apparatus includes an input device configured to input schedule information of a user; and the server apparatus includes an analyzing device configured to obtain and analyze the schedule information, and a switching instruction output device, configured to output an instruction to switch the image forming apparatus to the standby state or to the power-saving state based on information obtained as a result of analysis by the analyzing device.

Since the server apparatus obtains the schedule information and analyzes the information, it is possible to know whether the user of the information processing apparatus is absent. The user of information processing apparatus is also the user of image forming apparatus and, therefore, if the user is away from his/her seat, it is highly unlikely that the image forming apparatus is used by the user. Since the server apparatus outputs an instruction to switch the image forming apparatus to the standby state or to the power-saving state to the image forming apparatus based on the information obtained by analyzing the schedule information of the user, it becomes possible to switch the image forming apparatus from the standby state to the power-saving state if the user is absent and the image forming apparatus is substantially left unused. Therefore, even if automatic switching from the standby state to the power-saving state is set in accordance with the operation schedule by, for example, the operation schedule management function, the image forming apparatus can be switched from the standby state to the power-saving state if it is expected that the image forming apparatus will not be used. As a result, wasteful power consumption can be avoided and power consumption can further be reduced.

On the other hand, if the user of image forming apparatus is present, it is likely that the image forming apparatus is used. In such a situation, in the image forming system, the image forming apparatus can be kept in the standby state.

Preferably, the information processing apparatus further includes a storage device configured to store the schedule information input by the input device; and the analyzing device obtains the schedule information from the storage device and analyzes the schedule information. In this manner, the schedule information of the user of information processing apparatus may be held in the information processing apparatus.

Preferably, the server apparatus further includes a storage device configured to store the schedule information input from a plurality of information processing apparatuses, and the analyzing device analyzes the schedule information by obtaining the schedule information from the storage device. In this manner, the schedule information of the users of information processing apparatuses may be held in the server apparatus.

More preferably, the image forming system includes a plurality of information processing apparatuses. When the image forming apparatus is shared by a plurality of users and most of the users are absent, the image forming apparatus is substantially left unused. Since the server apparatus outputs an instruction to switch the image forming apparatus to the standby state or to the power-saving state to the image forming apparatus based on the information obtained by analyzing the schedule information of the user, it becomes possible to switch the image forming apparatus from the standby state to the power-saving state if most of the users are absent and the image forming apparatus is substantially left unused. As a result, wasteful power consumption can easily be avoided and power consumption can further be reduced easily. On the other hand, when the image forming apparatus is shared by a plurality of users and most of the plurality of users are in their seats, it is highly likely that the image forming apparatus is used. In such a situation, in the image forming system, the image forming apparatus can be kept in the standby state.

More preferably, the server apparatus further includes a device configured to store the image forming apparatus and an information processing apparatus used by a user of the image forming apparatus in association with each other; the schedule information includes time slot information of a meeting to which the user of the image forming apparatus attends; the analyzing device includes an extracting device configured to extract the time slot information of the meeting from the schedule information; and the switching instruction output device includes a device configured to output an instruction to switch the image forming apparatus to the standby state or to the power-saving state to the image forming apparatus, based on the extracted time slot information of the meeting.

If the user is attending a meeting, it is highly unlikely that the image forming apparatus is used by the user. Further, if the image forming apparatus is shared by a plurality of users and most of the users are attending the meeting, the image forming apparatus is substantially left unused. Therefore, by switching the image forming apparatus from the standby state to the power-saving state in such a situation, power-saving of the image forming apparatus which is substantially left unused during the meeting can easily be attained.

More preferably, the server apparatus further includes a device configured to store the image forming apparatus and each of the plurality of information processing apparatuses used by each of a group of users using the image forming apparatus in association with each other; the schedule information includes time slot information of a meeting to which users of the image forming apparatus attend; the analyzing device includes an extracting device configured to extract the time slot information of the meeting from the schedule information, and a determining device configured to determine, based on the time slot information of the meeting extracted by the extracting device, whether or not the number of attendees of the meeting is larger by at least a prescribed number than non-attendees of the meeting in the group of users using the image forming apparatus; and the switching instruction output device includes a device, configured to output an instruction to switch the image forming apparatus from the standby state to the power-saving state, if it is determined by the determining device that the number of attendees of the meeting is larger by at least the prescribed number than non-attendees.

In the group of users sharing the image forming apparatus, if the number of users attending the meeting is larger than those not attending the meeting by a prescribed number or more, it is highly likely that the image forming apparatus is left unused. In such a situation, power-saving of the image forming apparatus can easily be attained by switching the image forming apparatus from the standby state to the power-saving state. The meeting to which the users attend may be one meeting or different meetings.

Here, preferably, the switching instruction output device further includes a device configured to output an instruction to switch the image forming apparatus from the power-saving state to the standby state, if it is determined by the determining device that the number of users attending the meeting is not larger than those not attending the meeting by a prescribed number or more and the image forming apparatus is in the power-saving state.

If the number of users attending the meeting is not larger than those not attending the meeting by a prescribed number or more, it is likely that the image forming apparatus is used. Therefore, in such a situation, it is preferred to set the image forming apparatus to the standby state.

Preferably, the server apparatus further includes a device configured to store the image forming apparatus and each of the plurality of information processing apparatuses used by each of a group of users using the image forming apparatus in association with each other; the schedule information includes time slot information of a meeting to which users of the image forming apparatus attend; the analyzing device includes an extracting device configured to extract time slot information of a meeting to which a plurality of users of the group of users using the image forming apparatus attend, from the schedule information; and the switching instruction output device includes a device configured to output an instruction to switch the image forming apparatus to the standby state or to the power-saving state to the image forming apparatus, based on the time slot information of the meeting, such that the image forming apparatus is set in the power-saving state in the time slot in which the meeting is being held.

In the group of users sharing the image forming apparatus, if a plurality of members of the group attend a meeting, it is likely that the image forming apparatus is substantially left unused. The server apparatus may output an instruction to switch the image forming apparatus from the standby state to the power-saving state, for example, at the start time of the meeting, to save power of the image forming apparatus that will be substantially left unused during the meeting. Further, the server apparatus may switch the image forming apparatus from the power-saving state to the standby state at the end time of the meeting, to have the image forming apparatus ready to use after the meeting, when use of image forming apparatus becomes highly likely.

More preferably, the server apparatus further includes a device configured to store the image forming apparatus and each information processing apparatus used by each of the users of a group of users sharing the image forming apparatus in association with each other; the schedule information includes time slot information in which the user of the image forming apparatus is absent; the analyzing device includes an extracting device configured to extract, from the schedule information, the time slot information in which a plurality of users of the group of users sharing the image forming apparatus are absent; and the switching instruction output device includes a device configured to output an instruction to switch the image forming apparatus to the standby state or to the power-saving state based on the extracted time slot information, so that the image forming apparatus is set in the power-saving state in the extracted time slot.

In the group of users sharing the image forming apparatus, if a plurality of members of the group are away from their seats or absent, it is likely that the image forming apparatus is substantially left unused. The server apparatus may output an instruction to switch the image forming apparatus from the standby state to the power-saving state, for example, at the start time of the time slot in which a plurality of users are absent, to save power of the image forming apparatus that is substantially left unused. On the other hand, at the end of the time slot in which a plurality of users are away from their seats, it becomes highly likely that the image forming apparatus is used, since the users come back to their seats. The server apparatus may switch the image forming apparatus from the power-saving state to the standby state at the end of the time slot in which a plurality of users are absent, to have the image forming apparatus ready to use.

According to a second aspect, the present invention provides a server apparatus managing an image forming apparatus and an information processing apparatus, including: an information obtaining device configured to obtain schedule information of a user input from the information processing apparatus; an analyzing device configured to analyze the schedule information obtained by the information obtaining device; and a switching instruction outputting device configured to output an instruction to switch the image forming apparatus to a standby state or to a power-saving state to the image forming apparatus, based on information resulting from the analysis by the analyzing device. By using such a server apparatus, power consumption can further be reduced easily.

According to a third aspect, the present invention provides an image forming apparatus, including: a connecting device configured to be connected to an information processing apparatus through a network; an information obtaining device configured to obtain schedule information of a user input from the information processing apparatus; an analyzing device configured to analyze the schedule information obtained by the information obtaining device; and a switching device configured to switch a state of operation of the image forming apparatus itself to a standby state or to a power-saving state, based on information resulting from the analysis by the analyzing device. By using such an image forming apparatus, again, power consumption can further be reduced easily.

As described above, by the present invention, an image forming system, a server apparatus and an image forming apparatus that can further reduce power consumption can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 shows another example of schedule display screen image on the display of the client computer.

DESCRIPTION OF THE PREFERRED EMBODIMENTS

Figure 1:
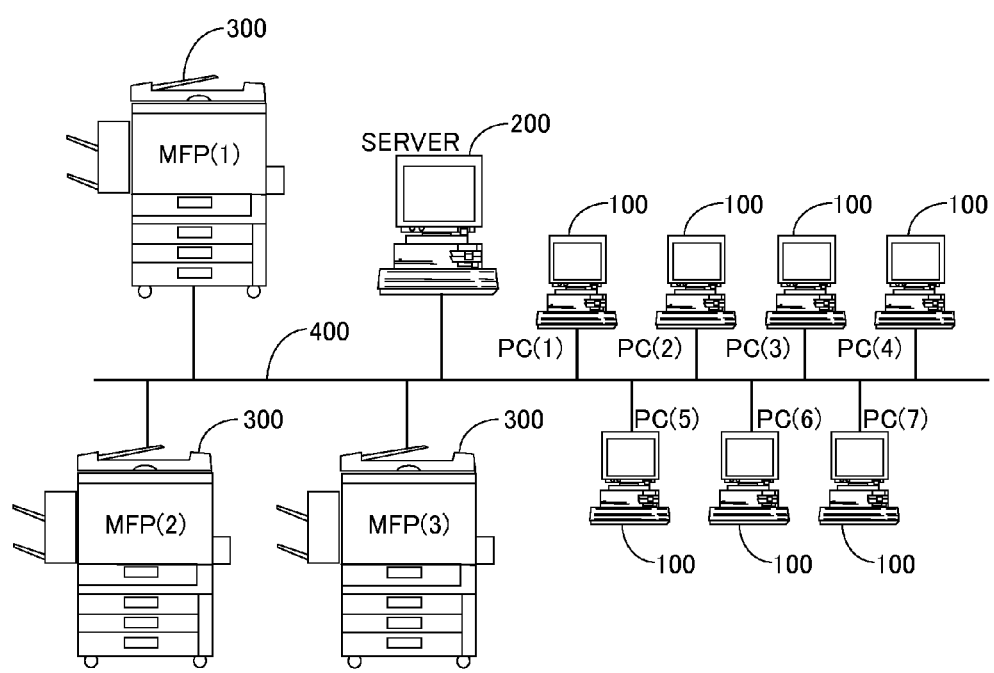
FIG. 1 shows an overall configuration of an image forming system in accordance with a first embodiment of the present invention.

In the following embodiments, the same components are denoted by the same reference characters. Their functions and names are also the same. Therefore, detailed description thereof will not be repeated. In the following description, an image forming apparatus (typically a printer) that receives a print request from a client computer (PC) as one type of image processing apparatus and forming an image on a sheet of recording paper is assumed to be an MFP. The image forming apparatus of the present invention, however, is not limited to the MFP, and it may be any device having at least the network-compatible printing function.

First Embodiment

[Overall System Configuration]

Referring to FIG. 1, overall system configuration of the present embodiment will be described. The image forming system includes: client computers 100 (personal computers PC (1) to PC (7) issuing a print request); MFPs 300 (MFP (1) to MFP (3)) receiving the print request and printing an image on a paper medium; and a server computer 200 managing the client computers 100 and MFPs 300. Client computers 100, server computer 200 and MFPs 300 are connected to be communicable with each other by a network line 400.

The numbers and arrangement of client computers 100, server computer 200 and MFPs 300 shown in FIG. 1 are only an example, and the numbers and arrangement are not limited to those shown in FIG. 1. MFPs denoted by the same reference characters may not necessarily be the image forming apparatuses having the same functions. It is noted, however, that any of the MFPs has the printing function.

Figure 2:
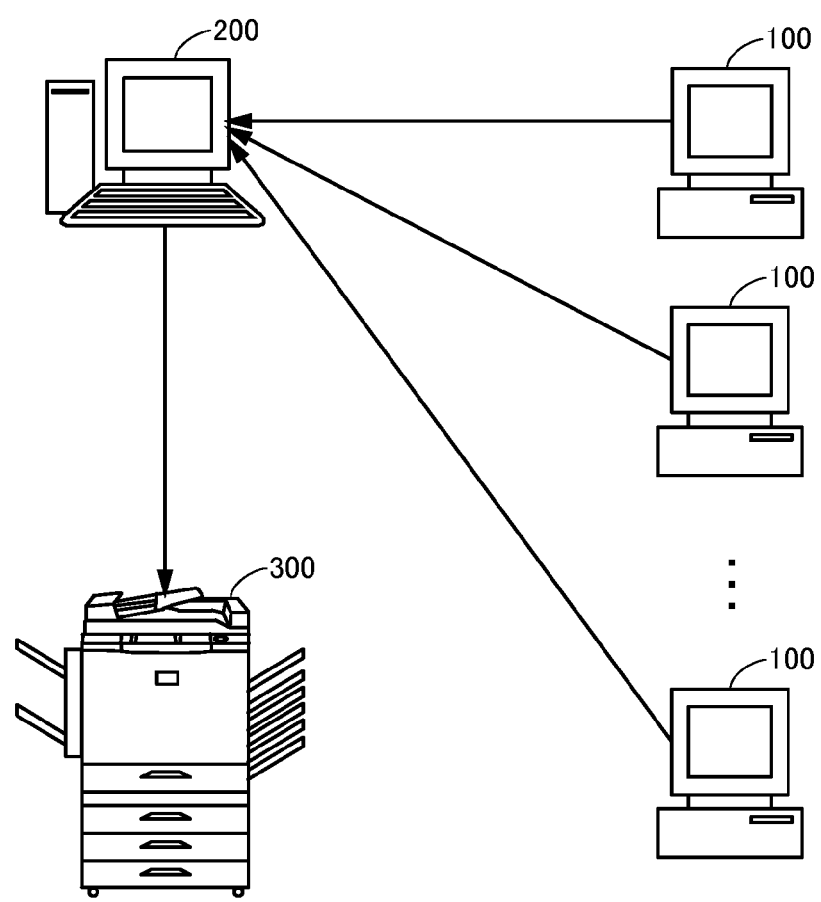
FIG. 2 shows an image forming system in accordance with the first embodiment of the present invention.

Referring to FIG. 2, in the image forming system in accordance with the present embodiment, server computer 200 obtains and analyzes schedule information of users held (saved) in a plurality of client computers 100 under the control of the server, and based on the obtained information, switches MFP 300 from the standby state (standby mode) to the power-saving state (power-saving mode) and from the power-saving mode to the standby mode.

In the following description and in the drawings, client computer 100 may also be simply referred to as a client, and server computer 200 may also be simply referred to as a server.

[Hardware Configuration]

<Client Computer 100>

Figure 3:
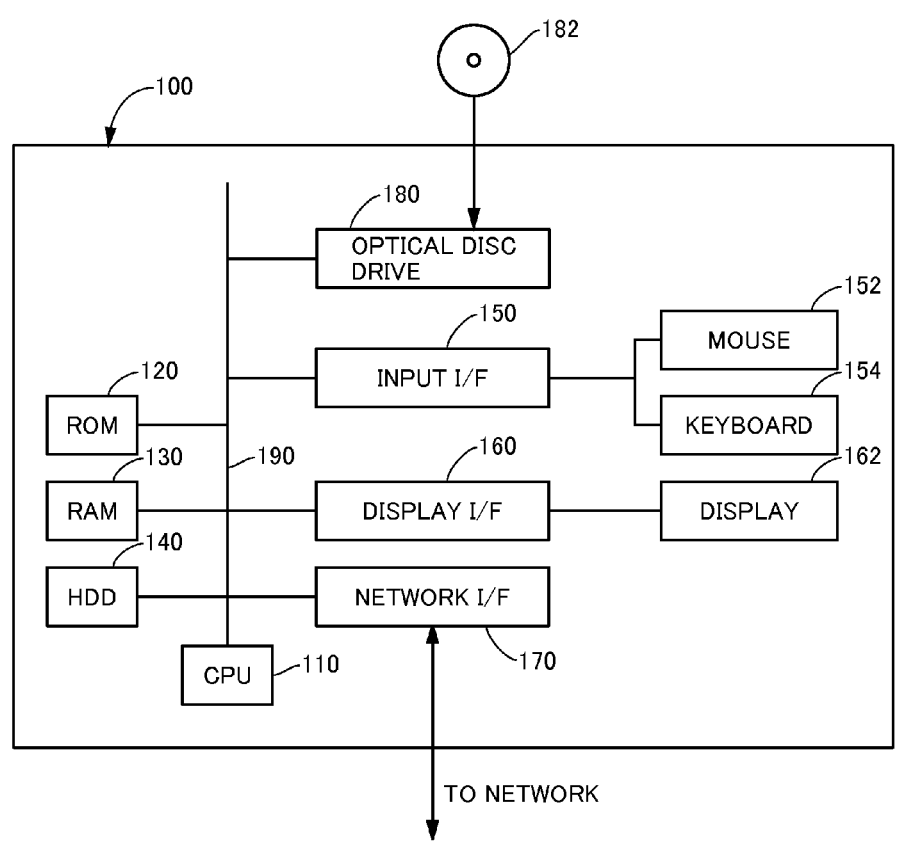
FIG. 3 is a control block diagram showing hardware configuration of a client computer shown in FIG. 1.

Referring to FIG. 3, client computer 100 forming the image forming system in accordance with the present embodiment includes: a bus 190; a CPU (Central Processing Unit) 110 connected to bus 190; an ROM (Read Only Memory) 120 connected to bus 190; an RAM (Random Access Memory) 130 connected to bus 190; a hard disk drive (HDD) 140 connected to bus 190; an optical disc drive 180 connected to bus 190, to which an optical disc 182 can be loaded and capable of writing information to optical disc 182 and reading information from optical disc 182; an input interface (hereinafter referred to as "input I/F") 150 connected to bus 190, for providing an interface to establish connection with a mouse 152 and a keyboard 154; a display interface (hereinafter referred to as "display I/F") 160 connected to bus 190, for providing an interface to establish connection with a display 162; and a network interface (hereinafter referred to as "network I/F") 170 providing wired or wireless (in the present embodiment, wired) connection to network line 400. Network I/F 170 may be an interface connecting client computer 100, which may be a note-book type computer, to network line 400 in wireless manner. Further, client computer 100 may include a magnetic disk drive, to which a magnetic disk can be loaded, capable of writing information to the magnetic disk and reading information from the magnetic disk, in place of/in addition to optical disc drive 180.

Bus 190, ROM 120, RAM 130, hard disk drive 140, optical disc drive 180, input I/F 150, display I/F 160 and network I/F 170 all operate in a coordinated manner under the control of CPU 110, and realize various application processes in client computer 100. These applications include, for example, word processor document producing process, spread sheet document producing process, or a printing process of transmitting electronic data formed by these producing processes to MFP 300.

In addition to the applications mentioned above, schedule management software (hereinafter also referred to as "scheduler") for managing schedule information of users (schedule of users) using client computer 100 is installed. Each user of client computer 100 may input his/her schedule information to client computer 100 using the schedule management software. The schedule information may include, for example, meeting, business trip, or day-off. If a meeting is input as the schedule information, in addition to the date of the meeting, time slot information including the start time and end time of the meeting is also input. If the installed schedule management software uses a standard format of a scheduler, the input schedule information is saved in hard disk drive 140 in that format.

The schedule management software has a function enabling sharing of schedule information of each of the client computers 100 connected through network line 400. In the present embodiment, the schedule information is shared by members of a specific group.

Figure 4:
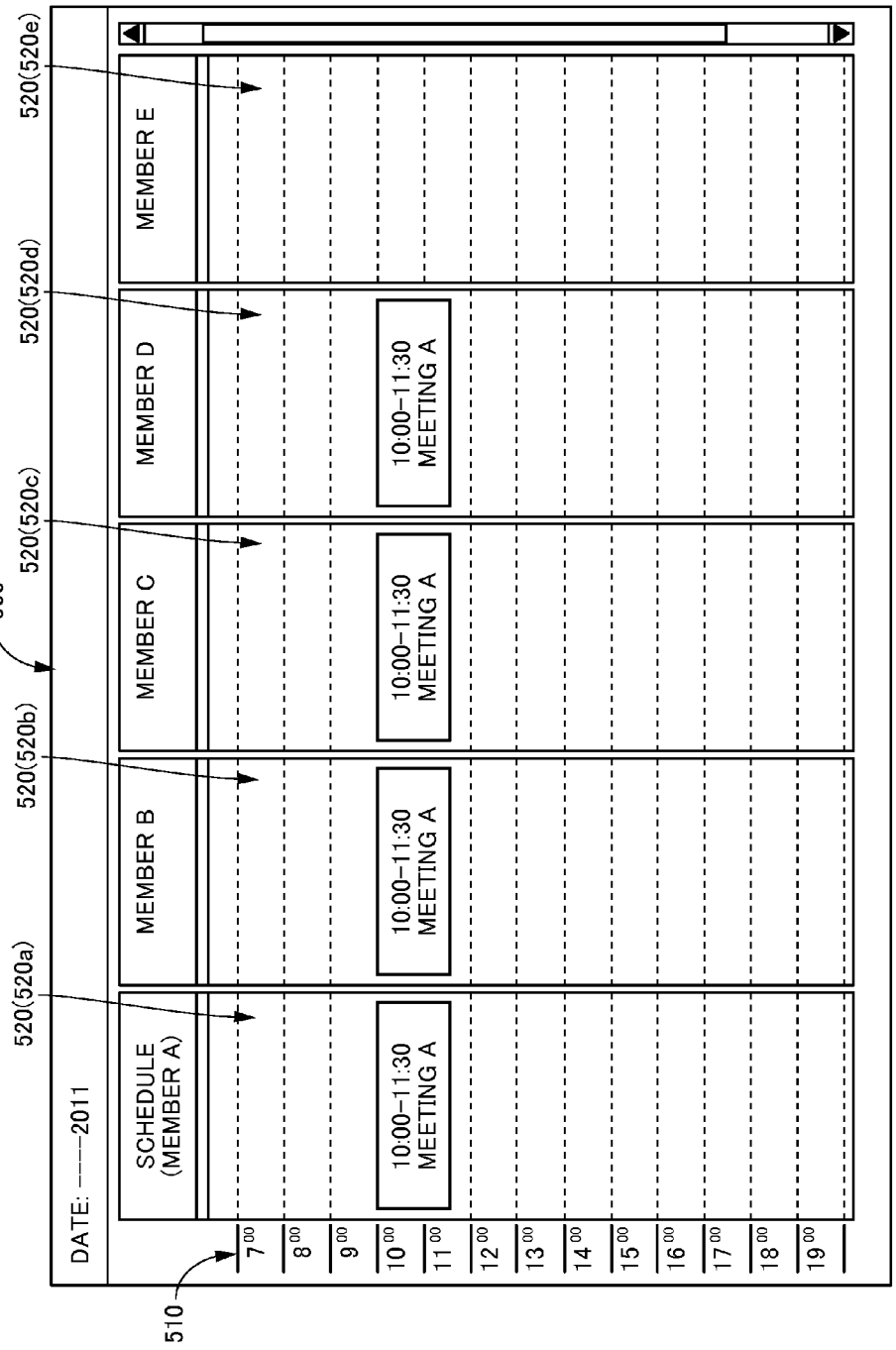
FIG. 4 shows an example of a schedule display screen image, on a display of the client computer shown in FIG. 1.

Referring to FIG. 4, on a schedule display screen 500 of the schedule management software, a time axis 510 and display columns 520 (520a to 520e) displaying schedule of each member of the specific group are displayed. Schedule display screen 500 of FIG. 4 shows schedules of a specific group of a certain day. On the left end of schedule display screen 500, the schedule of a user A (member A) of client computer 100 is displayed. On the right side of member A, schedules of other members of the specific group (for example, members B, C, D and E) (schedules of sharing members) are displayed.

The input schedule information is displayed and saved as time slot information. Schedule display screen 500 of FIG. 4 shows, as an example, that members A to D will attend a meeting A from 10:00 to 11:30, while member E will not attend the meeting A. As to the schedule management software, commercially available software or free software may appropriately be used. Specific example of the schedule management software is "Outlook" of Microsoft.

A computer program that causes client computer 100 to execute such a process as described above is stored in an optical disc 182 loaded to optical disc drive 180, and transferred to hard disk drive 140. Alternatively, the program may be transmitted through network line 400 to client computer 100 and described in hard disk drive 140. At the time of execution, the program is loaded to RAM 130. The program may be directly loaded to RAM 130 from optical disc 182 or through network line 400.

Such a program includes a plurality of instructions causing client computer 100 to execute prescribed processes. Some of the basic functions necessary to carry out such an operation are provided by an operating system (OS) operating on client computer 100 or by a third-party program, or modules of various tool kits installed in client computer 100. Therefore, the program may not include all functions necessary to realize the system of the present embodiment. The program may include only the instructions to call appropriate functions or "tools" in a controlled manner to attain desired results to cause client computer 100 to execute prescribed processes, among the instructions. General operations of a computer implementing client computer 100 are well known and, therefore, description thereof will not be repeated here.

<Server Computer 200>

Figure 5:
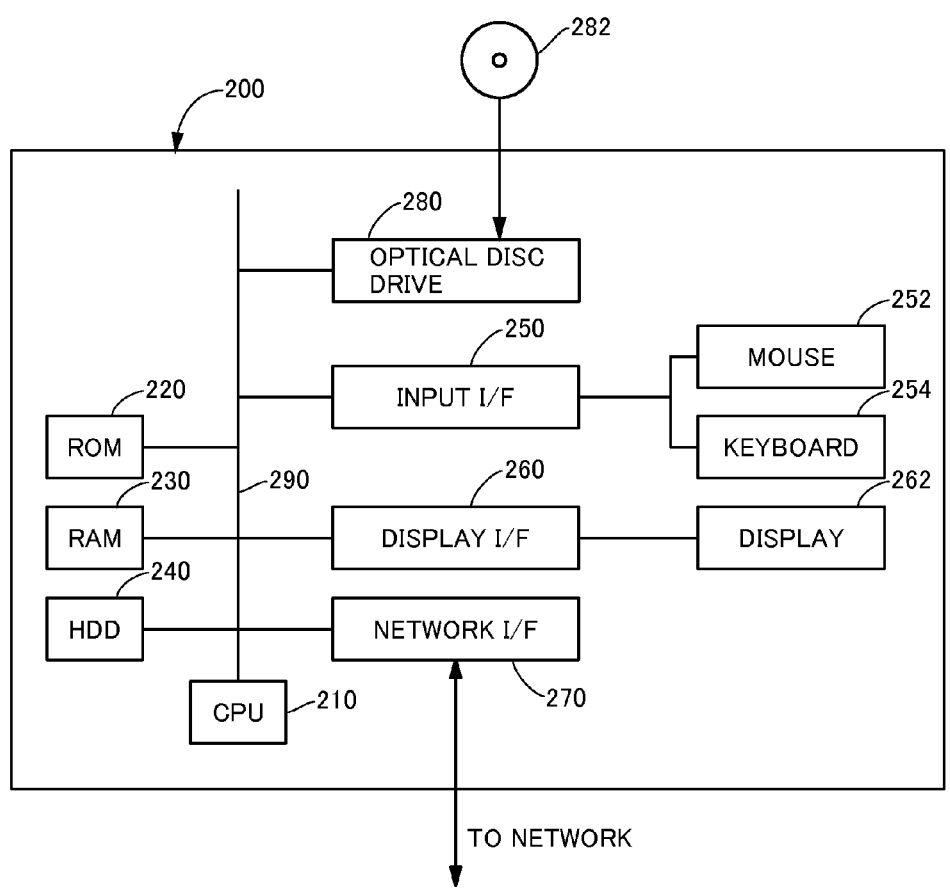
FIG. 5 is a control block diagram showing hardware configuration of a server computer shown in FIG. 1.

Referring to FIG. 5, server computer 200 communicating with client computer 100 in accordance with the present embodiment is a computer having a configuration similar to that of client computer 100 described above. Components of higher reliability than those used in a so-called personal computer are used in such a server computer.

Server computer 200 includes: a bus 290; a CPU 210 connected to bus 290; an ROM 220 connected to bus 290; an RAM 230 connected to bus 290; a HDD 240 connected to bus 290; an optical disc drive 280 connected to bus 290, to which an optical disc 282 can be loaded and capable of writing information to optical disc 282 and reading information from optical disc 282; an input I/F 250 connected to bus 290, for providing an interface to establish connection with a mouse 252 and a keyboard 254; a display I/F 260 connected to bus 290, for providing an interface to establish connection with a display 262; and a network I/F 270 providing wired or wireless (in the present embodiment, wired) connection to network line 400. Further, server computer 200 may also include a magnetic disk drive in place of/in addition to optical disc drive, as in client computer 100.

Bus 290, ROM 220, RAM 230, hard disk drive 240, optical disc drive 280, input I/F 250, display I/F 260 and network I/F 270 all operate in a coordinated manner under the control of CPU 210, and realize various application processes in server computer 200. These applications, for example, realize the server computer of the image forming system, which obtains the schedule information input to client computers 100 (schedule information of members of a specific group), and based on the information obtained by analyzing the obtained schedule information, appropriately manages the MFP used by client computers 100.

Server computer 200 also has a management table 600 (see FIG. 6) for managing client computers 100 and image forming apparatuses (MFP 300). Management table 600 is stored in hard disk drive 240, ROM 220 or the like.

Figure 6:
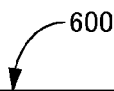
FIG. 6 shows an example of a management table stored in the server computer.

Referring to FIG. 6, in management table 600, IDs (for example, IP addresses) of image forming apparatuses (MFPs 300 controlled by server computer 200) and names of PCs of members sharing each image forming apparatus, connected to network line 400, are stored in association with each other. Specifically, in server computer 200, PCs (client computers 100) of members who use each image forming apparatus are registered, corresponding to the used image forming apparatus (MFP 300). More specifically, in management table 600, for an image forming apparatus (MFP 300), PCs of the members who use the MFP 300 are listed. For instance, PCs of members of a specific group are registered corresponding to the MFP 300 used by these members.

Further, server computer 200 further has threshold value information for determining whether MFP 300 is to be switched from the standby state to the power-saving state or from the power-saving state to the standby state, stored in RAM 230, hard disk drive 240 or the like.

A computer program that causes server computer 200 to execute operations of the server computer in the image forming system in accordance with the present embodiment is stored in an optical disc 282 loaded to optical disc drive 280 and transferred to hard disk drive 240. Alternatively, the program may be transmitted through network line 400 to server computer 200 and stored in hard disk drive 240. At the time of execution, the program is loaded to RAM 230. The program may be directly loaded to RAM 230 from optical disc 282 or through network line 400.

Such a program includes a plurality of instructions causing server computer 200 to execute prescribed processes. Some of the basic functions necessary to carry out such an operation are provided by an operating system (OS) operating on server computer 200 or by a third-party program, or modules of various tool kits installed in server computer 200. Therefore, the program may not include all functions necessary to realize the system of the present embodiment. The program may include only the instructions to call appropriate functions or "tools" in a controlled manner to attain desired results to cause server computer 200 to execute prescribed processes, among the instructions. General operations of a computer implementing server computer 200 are well known and, therefore, description thereof will not be repeated here.

<MFP 300>

Figure 7:
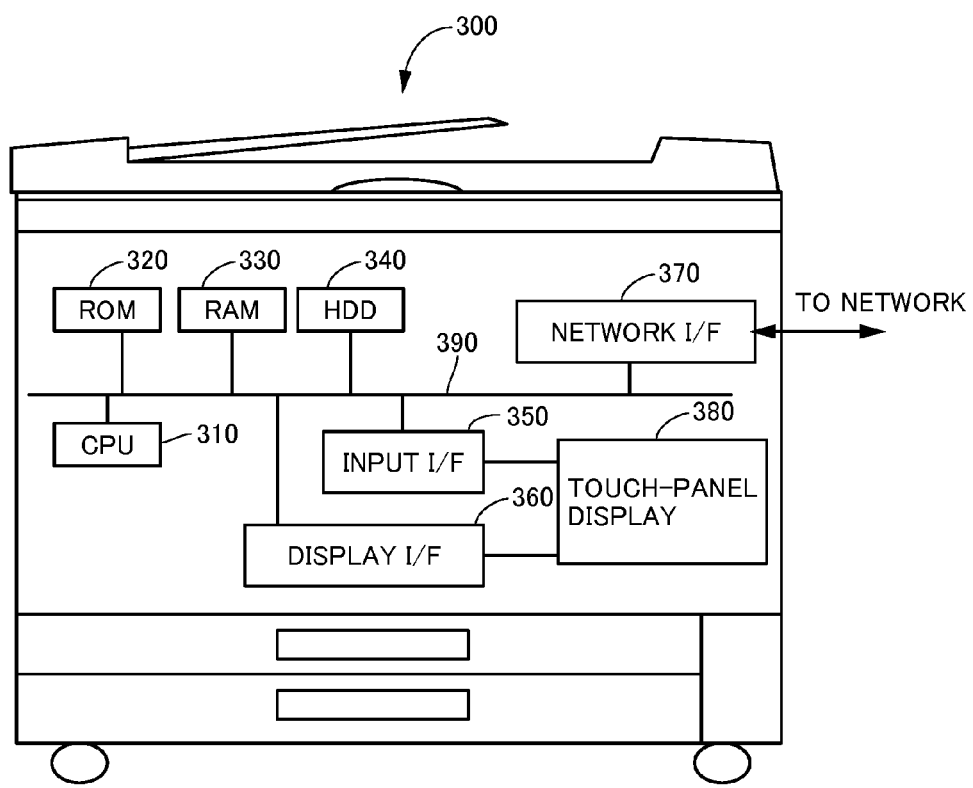
FIG. 7 is a control block diagram showing hardware configuration of an MFP shown in FIG. 1.

Referring to FIG. 7, MFP 300 forming the image forming system includes: a bus 390; a CPU 310 connected to bus 390; an ROM 320 connected to bus 390; an RAM 330 connected to bus 390; a hard disk drive (HDD) 340 connected to bus 390; an input I/F 350 and a display I/F 360 connected to bus 390, for providing an interface to establish connection with a touch-panel display 380; and a network I/F 370 providing wired or wireless (in the present embodiment, wired) connection to network line 400.

Bus 390, ROM 320, RAM 330, hard disk drive 340, input I/F 350, display I/F 360 and network I/F 370 all operate in coordinated manner under the control of CPU 310, and realize printing process, FAX transmission/reception process, scanner process, copy process and the like of MFP 300. These processes are executed by various components forming MFP 300, not shown in FIG. 7, under control of CPU 310.

MFP 300 includes, for example, a document reading unit, an image forming unit, a paper feed unit and a paper discharge unit. In MFP 300, on image data received from client computer 100 or on document image data read by the document reading unit, various image processing operations are done by CPU 310, and the image data is output to the image forming unit. MFP 300 has a so-called laser type (electrophotography) printing function, in which laser beam is used for exposure. The apparatus, however, may have a different printing function. Further, document reading unit is capable of reading a document in color mode and producing color image data (if the document is a color document).

The image forming unit is for printing an image represented by the image data on a sheet of recording paper, and it includes, for example, a photoreceptor drum, a charger, a laser scan unit, a developer, a transfer device, a cleaning device, a fixing device, and an eraser device. A feeding path, for example, is provided in the image forming unit and a sheet of recording paper fed from a paper feed unit is conveyed along the feeding path. The paper feed unit draws out sheets of recording paper held in a paper cassette or placed on a manual feed tray one by one and feeds to the feeding path of the image forming unit.

While the sheet of recording paper is conveyed along the feeding path of the image forming unit, the sheet passes between the photoreceptor drum and the transfer device, and further passes through the fixing device, whereby printing is done on the sheet of recording paper.

The photoreceptor drum rotates in one direction and its surface is cleaned by the cleaning device and the eraser device, and thereafter uniformly charged by the charger. The laser scan unit modulates a laser beam based on the image data as the object of printing, and repeatedly scans the surface of photoreceptor drum with the laser beam in a main scanning direction, to form an electrostatic latent image on the surface of photoreceptor drum. The developer supplies toner to the surface of photoreceptor drum to develop the electrostatic latent image, and thereby forms a toner image on the surface of photoreceptor drum.

The transfer device transfers the toner image on the surface of photoreceptor drum to the sheet of recording paper that is passing between the transfer device and the photoreceptor drum. The fixing device includes a heating roller for heating the sheet of recording paper and a pressure roller for pressing the sheet of recording paper. The sheet of recording paper is heated by the heating roller and pressed by the pressure roller, so that the toner image that has been transferred to the sheet of recording paper is fixed on the sheet. The sheet of recording paper discharged from the fixing device (printed sheet) is discharged to a paper discharge tray. In the paper discharge device, a process of sorting and discharging a plurality of sheets of recording paper to discharge trays, a process of punching the recording paper, or a process of stapling a bundle of recording paper may be executed. For instance, if a plurality of sets of prints are to be formed, sheets of recording paper are sorted and discharged to respective discharge trays such that one discharge tray is allocated to one set of prints, and for each discharge tray, punching or stapling is done on the bundle of sheets on the tray, to prepare copies of prints. These various processes are executed under the control of CPU 310. The punching may be done sheet by sheet.

MFP 300 is configured to be switchable between a standby state, that is, a normal conduction state, and a power-saving state in which power is turned off or power supply to an unused unit or units (also referred to as module or modules) is suspended to reduce power consumption.

[Software Configuration]

Figure 8:
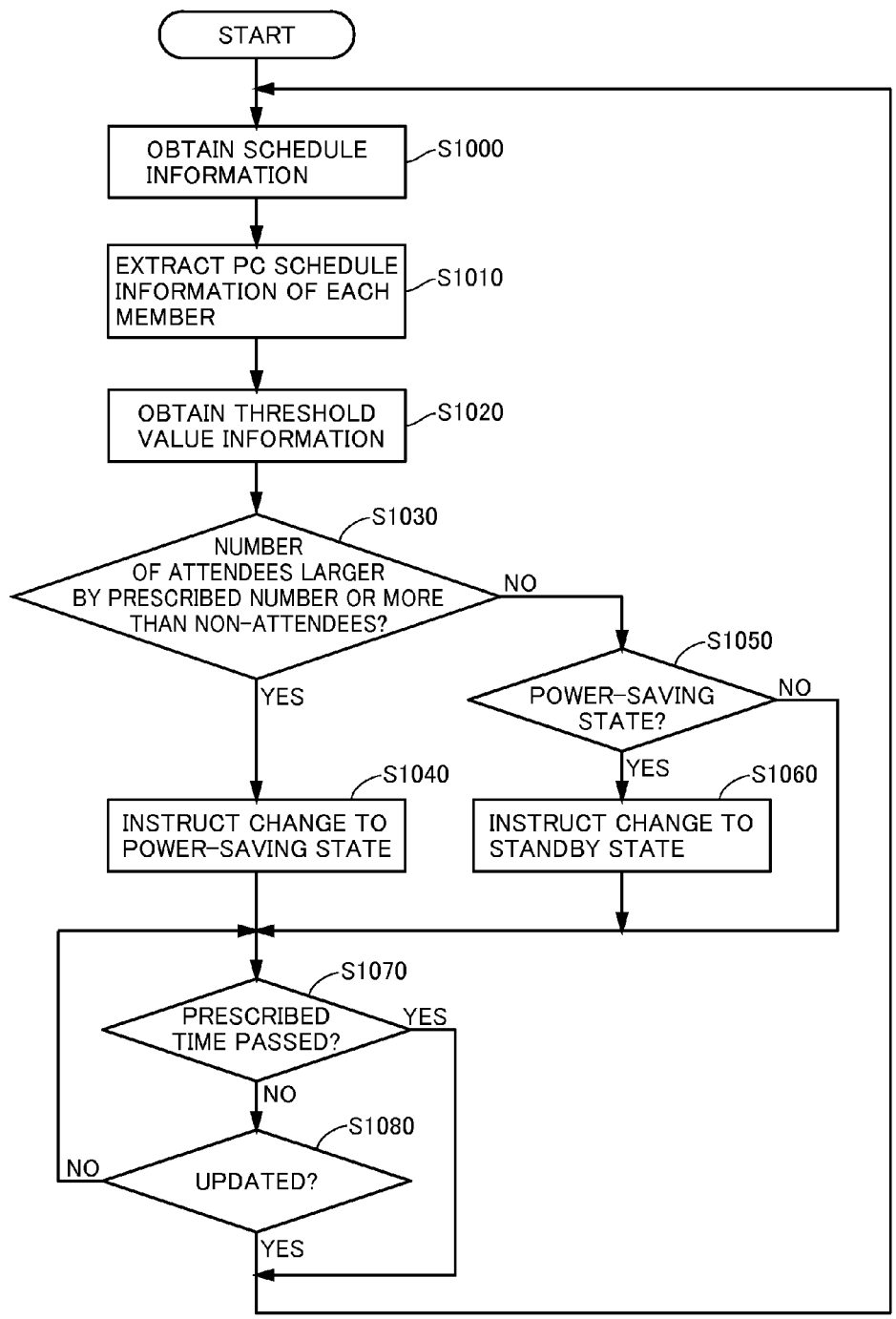
FIG. 8 is a flowchart representing a control structure of a program executed by the server computer shown in FIG. 1.

Referring to FIG. 8, a control structure of a computer program executed by server computer 200 in order to manage the state of operation of MFP 300 in the image forming system in accordance with the present embodiment will be described. In the following description, it is assumed that in the initial state, MFP 300 is in the standby state.

The program includes: a step S1000 of patrolling a plurality of client computers 100 under control to search for the scheduler of each client computer 100, and obtaining schedule information; a step S1010, following step S1000, of looking up management table 600 shown in FIG. 6 and thereby extracting schedule information of members (users) of a specific group; and a step S1020, following step S1010, of obtaining (reading) threshold information stored, for example, in hard disk drive 240.

At step S1010, by analyzing the obtained schedule information, meeting time slot information of members (users) of a specific group using a certain MFP 300 is extracted from the obtained schedule information. More specifically, time slot information of a user or users who have entered a meeting in the schedule at the time point when the schedule information is obtained is extracted. At step S1020, a prescribed value (X) is obtained as the threshold value information.

The program further includes: a step S1030, following step S1020, of determining, based on the information resulting from the analysis of obtained schedule information (meeting time slot information of members of the specific group extracted from the schedule information), whether or not the number of attendees (N1) of the meeting (the number of members who attend the meeting) is larger by at least a prescribed number (prescribed value (X)) than the number of non-attendees (N2) (the number of members who do not attend the meeting) in the specific group, and branching the flow of control depending on the result of determination; and a step S1040, executed if it is determined at step S1030 that the number of attendees is larger by the prescribed number or more than the number of non-attendees, of changing (switching) the state of operation (operational mode) of the MFP 300 used by the specific group, from the standby state to the power-saving state.

The program further includes: a step S1050, executed if it is determined at step S1030 that the number of attendees is not larger by at least the prescribed number than the number of non-attendees in the specific group, of determining whether or not the MFP 300 used by the specific group is in the power-saving mode, and branching the flow of control depending on the result of determination; a step S1060, executed if MFP 300 is determined to be in the power-saving state at step S1050, of outputting an instruction to change (switch) the state of operation of MFP 300 from the power-saving state to the standby state; a step S1070, executed after step S1040 or S1060, or if it is determined at step S1050 that MFP 300 is not in the power-saving state, of determining whether a prescribed time period (for example, about 15 minutes to about 60 minutes) has passed from when the schedule information was obtained, and branching the flow of control depending on the result of determination; and a step S1080, executed if it is determined at step S1070 that the prescribed time period has not yet passed, of determining whether or not the schedule information has been updated, and branching the flow of control depending on the result of determination.

If it is determined at step S1080 that the schedule information is not updated, the control returns to step S1070. If it is determined at step S1070 that the prescribed time period has passed, and if it is determined at step S1080 that the schedule information has been updated, the control returns to step S1000 and the process steps described above are repeated.

[Operation]

Referring to FIGS. 4, 6 and 8, an operation of the image forming system in accordance with the present embodiment based on the configuration and flowchart above will be described.

Assume that members of a specific group using a certain MFP 300 each have entered the schedule information to his/her own PC (client computer 100). Referring to FIG. 4, for example, members A to D, who are users of MFP 300, have a plan to attend meeting A from 10:00 to 11:30, while member E does not have any plan from 10:00 to 11:30.

Server computer 200 patrols PCs of the registered members with reference to management table 600 shown in FIG. 6, searches for the schedulers of registered PCs at a prescribed time and obtains schedule information (step S1000 of FIG. 8). By way of example, assume that server computer 200 obtains the schedule information at 10:00. After obtaining the schedule information, server computer 200 extracts the meeting time slot information of the members of the specific group from the obtained schedule information. For example, referring to FIG. 4, members A to D have meeting A from 10:00 to 11:30 and, therefore, the time slot information of meeting A to which members A to D attend, is extracted (step S1010 of FIG. 8).

After extracting the time slot information, server computer 200 obtains the prescribed value (X) as the threshold value information (step S1020 of FIG. 8). Server computer 200 determines whether the number of attendees of the meeting (N1) is larger by at least the prescribed number (constant number) than the number of non-attendees of the meeting (N2). Specifically, it determines whether the following relation is satisfied (true) or not (false).

$$N1-N2 > \text{prescribed value } (X) \tag{1}$$

If the relation (1) is satisfied, it is determined that the number of attendees of the meeting (N1) is larger by at least the prescribed number (prescribed value (X)) than the number of non-attendees of the meeting (N2) (YES at step S1030), and if the relation (1) is not satisfied, it is determined that the number of attendees of the meeting (N1) is not larger by at least the prescribed number than the number of non-attendees of the meeting (N2) (NO at step S1030).

Assume, for example, that the prescribed number (X) is 2. Then, in the example shown in FIG. 4, the number of attendees of meeting A is 4 and non-attendee is 1, and, hence, the relation (1) is satisfied (4−1>2). Therefore, here, it is determined that the number of attendees of the meeting (N1) is larger by at least the prescribed number than the number of non-attendees of the meeting (N2).

If the number of attendees of the meeting (N1) is larger by at least the prescribed number than the number of non-attendees of the meeting (N2), it follows that most of the members belonging to the specific group will be absent. Therefore, in the time slot of the meeting (the time slot of meeting A, i.e., 10:00-11:30), MFP 300 used by this group will substantially lie idle and be left unused.

In such a situation, server computer 200 outputs an instruction to change the state of operation from the standby state to the power-saving state to MFP 300 (step S1040 of FIG. 8). When MFP 300 receives the output from server computer 200, the state of operation of MFP 300 changes from the standby state to the power-saving state.

On the other hand, if the number of attendees of the meeting (N1) is not larger by at least the prescribed number than the number of non-attendees of the meeting (N2) (if the relation (1) is not satisfied), server computer 200 first determines whether or not MFP 300 is in the power-saving state. If it is not in the power-saving state (in the standby state (NO at step S1050)), server computer 200 does not output an instruction to change the state of operation from the standby state to the power-saving state but maintains the standby state. If MFP 300 is in the power-saving state (YES at step S1050), server computer 200 outputs an instruction to change the state of operation from the power-saving state to the standby state to MFP 300 (step S1060 of FIG. 8). Assume, for example, that once MFP 300 enters the power-saving state while the members are attending the meeting, and thereafter, the relation (1) becomes unsatisfied as the meeting ends. Then, server computer 200 outputs an instruction to change the state of operation from the power-saving state to the standby state. When MFP 300 receives the output from server computer 200, the state of operation of MFP 300 is changed from the power-saving state to the standby state.

When a prescribed time period has passed from when the schedule information was obtained by server computer 200, it is possible that the meeting has already ended. In such a case (YES at step S1070), control of the program by server computer 200 returns to step S1000, and the same process steps are repeated. If the prescribed time period has not yet passed from when the schedule information was obtained by server computer 200 (NO at step S1070), server computer 200 patrols the plurality of client computers under control and searches for the scheduler of each client computer, and determines whether or not any new schedule has been entered (whether the schedule information has been updated). If the schedule information has been updated (YES at step S1080), the control of the program by server computer 200 is returned to step S1000, and the same process steps are repeated. If the schedule information has not been updated (NO at step S1080), the control of the program by server computer 200 is returned to step S1070, and the process of steps S1070 and S1080 is repeated.

[Effects of the Invention]

As is apparent from the foregoing, the following effects can be attained by using the image forming system in accordance with the present embodiment.

Since server computer 200 obtains the schedule information and analyzes the information, the state of presence/absence of the users (members) of client computers 100 can be known. Users of client computer 100 are also the users of MFP 300. If a user is absent, it is very unlikely that MFP 300 is used by the user. If MFP 300 is shared by a plurality of users and most of the users are absent, MFP 300 is substantially left unused.

Based on the information obtained by analyzing the schedule information, server computer 200 outputs an instruction to switch MFP 300 to the standby state or the power-saving state to MFP 300 and, therefore, if most of the members of a specific group are absent as they attend a meeting or the like and MFP 300 is substantially left unused, MFP 300 can automatically switched from the standby state to the power-saving state. Therefore, even when an operation schedule management function or the like automatically sets switching from the standby state to the power-savings state in accordance with an operation schedule, MFP 300 can be switched from the standby state to the power-saving state if it is expected that MFP 300 would be left unused. As a result, wasteful power consumption can be avoided and power consumption can further be reduced.

On the other hand, when most of the members of a specific group are present, it is highly likely that MFP 300 is used. In such a situation, in the present image forming system, MFP 300 can be kept in the standby state.

Further, if the number of attendees of the meeting is larger by at least a prescribed number than the number of non-attendees in a specific group using MFP 300, it is highly likely that MFP 300 will be substantially left unused. In such a situation, MFP 300 is switched from the standby state to the power-saving state and, therefore, power-saving of MFP 300 can be attained. On the other hand, if the number of attendees of the meeting is not larger by at least a prescribed number than the number of non-attendees, MFP 300 will likely be used. Therefore, in such a situation, MFP 300 is set in the standby state.

In the present embodiment, since the information is obtained from common schedule management software (for example, "Outlook"), it is unnecessary to produce and mange schedules anew.

As described above, by using the image forming system in accordance with the present embodiment, power consumption can further be reduced.

Second Embodiment

In the image forming system in accordance with the present embodiment, based on the meeting time slot information extracted from the schedule information, when the start time of a meeting is reached, the state of operation of MFP 300 is switched from the standby state to the power-saving state, and when the end time of the meeting is reached, the state of operation of MFP 300 is changed from the power-saving state to the standby state.

[Overall System Configuration]

The image forming system in accordance with the present embodiment includes a server computer 200A in place of server computer 200 of the first embodiment described above. With sever computer 200A, the present embodiment is configured to switch the state of operation of MFP 300 from the standby state to the power-saving state when the start time of a meeting is reached, and to switch the state of operation of MFP 300 from the power-saving state to the standby state when the end time of the meeting is reached.

[Hardware Configuration]

In the present embodiment, configurations of client computer 100 and MFP 300 are the same as those described with reference to the first embodiment and, therefore, detailed description thereof will not be repeated.

<Server Computer 200A>

Figure 9:
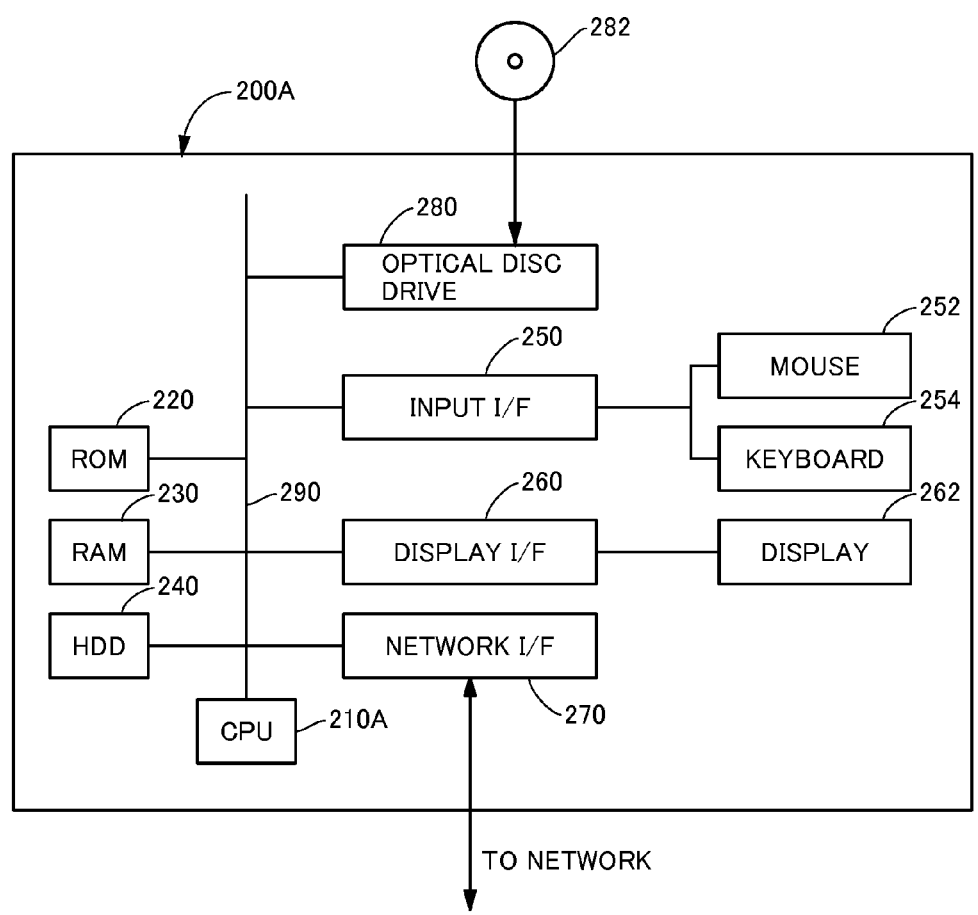
FIG. 9 is a control block diagram showing hardware configuration of a server computer of an image forming system in accordance with a second embodiment of the present invention.

Referring to FIG. 9, server computer 200A in accordance with the present embodiment includes a CPU 210A, in place of CPU 210 of the first embodiment described above. Server computer 200A including CPU 210A executes the computer program described in the following.

[Software Configuration]

Figure 10:
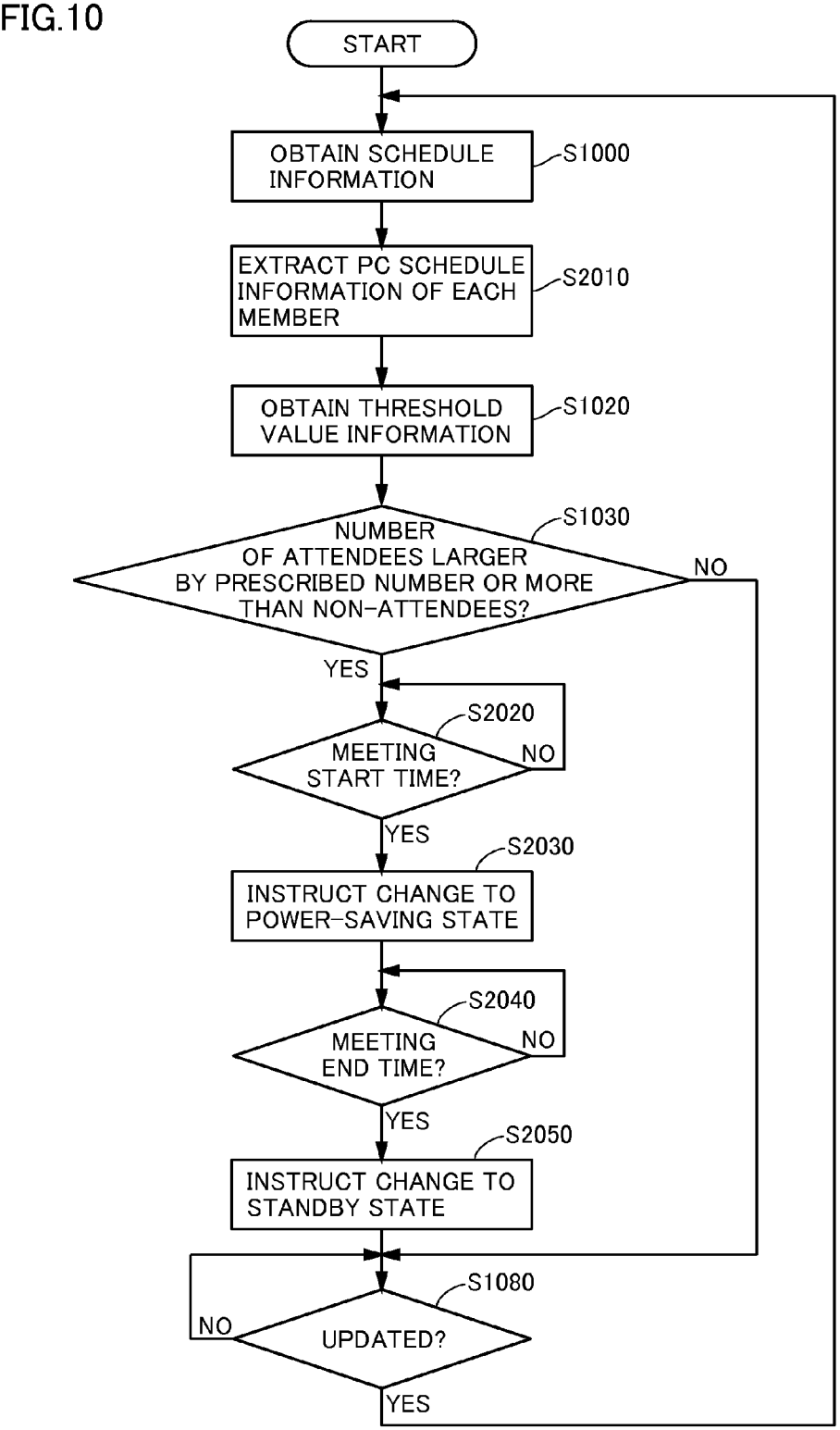
FIG. 10 is a flowchart representing a control structure of a program executed by the server computer of FIG. 9.

Referring to FIG. 10, in the image forming system (server computer 200A) in accordance with the present embodiment, the process steps except for steps S2010, S2020, S2030, S2040 and S2050 are the same as the process steps executed by the computer program shown in FIG. 8. Different from the first embodiment, in the present embodiment, MFP 300 is automatically changed to the standby state at the end time of a meeting, based on the extracted meeting time slot information and, therefore, steps S1050 and S1070 of FIG. 8 are not included. The present embodiment includes steps S2010, S2030 and S2050, in place of steps S1010, S1040 and S1060 of FIG. 8. In the following, the difference will be described.

The program includes: a step S2010, following step S1000, of extracting schedule information of members of a specific group; a step S2020, executed if it is determined at step S1030 that the number of attendees of a meeting is larger by the prescribed number or more than the number of non-attendees among the members of the specific group, of determining whether current time is the start time of the meeting to which the members attend, and waiting until the start time of the meeting is reached; a step S2030, executed if it is determined at step S2020 that the current time is the start time of the meeting to which the members attend, of outputting an instruction to change the state of operation from the standby state to the power-saving state to MFP 300 used by the specific group; a step S2040, following step S2030, of determining whether or not the current time is the end time of the meeting to which the members are attending, and waiting until the end time of the meeting is reached; and a step S2050, executed if it is determined at step S2040 that it is the end time of the meeting to which the members are attending, of outputting an instruction to switch the state of operation from the power-saving state to the standby state, to MFP 300 used by the specific group.

At step S2010, from the schedule information resulting from analysis of the obtained schedule information, the meeting time slot information of members of a specific group using a certain MFP 300 is extracted. Specifically, time slot information of members who have entered a meeting in the schedule following the time point when the schedule information was obtained is extracted.

If it is determined at step S1030 that, based on the meeting time slot information extracted from the schedule information, the number of attendees is not larger by the prescribed number or more than the number of non-attendees among the members of the specific group, that is, if meeting schedule of which number of attendees is larger by the prescribed number or more than the number of non-attendees is not entered, the control proceeds to step S1080. At step S1080, the control waits until the schedule information is updated, and if the schedule information is updated, the control returns to step S1000.

[Operation]

Referring to FIGS. 4 and 10, the image forming system in accordance with the present embodiment operates in the following manner. Except for the operation of switching the state of operation of MFP, other operations are the same as those of the first embodiment. Therefore, detailed description of the same operations will not be repeated.

Server computer 200A extracts meeting time slot information of members of a specific group from the obtained schedule information. Server computer 200A determines, from the extracted meeting time slot information, whether or not there is time slot information of a meeting of which number of attendees is larger by the prescribed number or more than the number of non-attendees (step S1030 of FIG. 10). If there is time slot information of a meeting of which number of attendees is larger by the prescribed number or more than the number of non-attendees (YES at S1030), server computer 200A determines whether or not the current time is the start time of the meeting, and if not, waits until the start time of the meeting is reached (step S2020 of FIG. 10).

Specifically, assume, for example, that a meeting A is planned, of which number of attendees is larger by the prescribed number or more than the number of non-attendees, as shown in FIG. 4. The start time of meeting A is 10:00, and the end time is 11:30. Here, server computer 200A determines whether or not the current time is 10:00, and if it is not 10:00, it waits until 10:00.

If the current time reaches the start time of the meeting, server computer 200A outputs an instruction to change the state of operation from the standby state to the power-saving state, to MFP 300 used by the members of the specific group (step S2030 of FIG. 10). When MFP 300 receives the output from server computer 200A, the state of operation of MFP 300 is switched from the standby state to the power-saving state.

Once MFP 300 is switched to the power-saving mode, server computer 200A waits until the end time of the meeting (step S2040 of FIG. 10). If the current time reaches the end time of the meeting (in the example shown in FIG. 4, 11:30), server computer 200A outputs an instruction to switch the state of operation from the power-saving state to the standby state, to MFP 300 (step S2050 of FIG. 10). When MFP 300 receives the output from server computer 200A, the state of operation of MFP 300 is switched from the power-saving state to the standby state.

When the schedule is updated, the operation similar to the above is repeated.

[Effects of the Present Embodiment]

As is apparent from the foregoing, the following effects can be attained by using the image forming system in accordance with the present embodiment.

When a plurality of members of a specific group that uses MFP 300 attend a meeting, it is possible that MFP 300 is substantially left unused. By way of example, if the number of attendees is larger by the prescribed number or more than the number of non-attendees of the meeting among the members of the specific group, it is highly likely that MFP 300 will be substantially left unused during the meeting. As server computer 200A outputs an instruction to switch MFP 300 from the standby state to the power-saving state at the start time of the meeting, power-saving in MFP 300 that is substantially unused during the meeting can be attained. Further, as server computer 200A switches MFP 300 from the power-saving state to the standby state at the end time of the meeting, MFP 300 is ready after the end of the meeting, when use of MFP 300 is highly expected.

Third Embodiment

In the image forming system in accordance with the present embodiment, schedule information input from client computer 100 is stored (held) in server computer 200B, and the schedule information is shared among client computers 100. Specifically, in the present embodiment, groupware as system software for information sharing utilizing a computer network is used.

[Overall System Configuration]

The image forming system in accordance with the present embodiment includes a server computer 200B in place of server computer 200 of the first embodiment described above. With sever computer 200B, the present embodiment is configured such that the schedule information input from client computer 100 is stored in server computer 200B, and the schedule information is shared among client computers 100.

[Hardware Configuration]

In the present embodiment, configurations of client computer 100 and MFP 300 are the same as those described with reference to the first embodiment and, therefore, detailed description thereof will not be repeated.

<Server Computer 200B>

Figure 11:
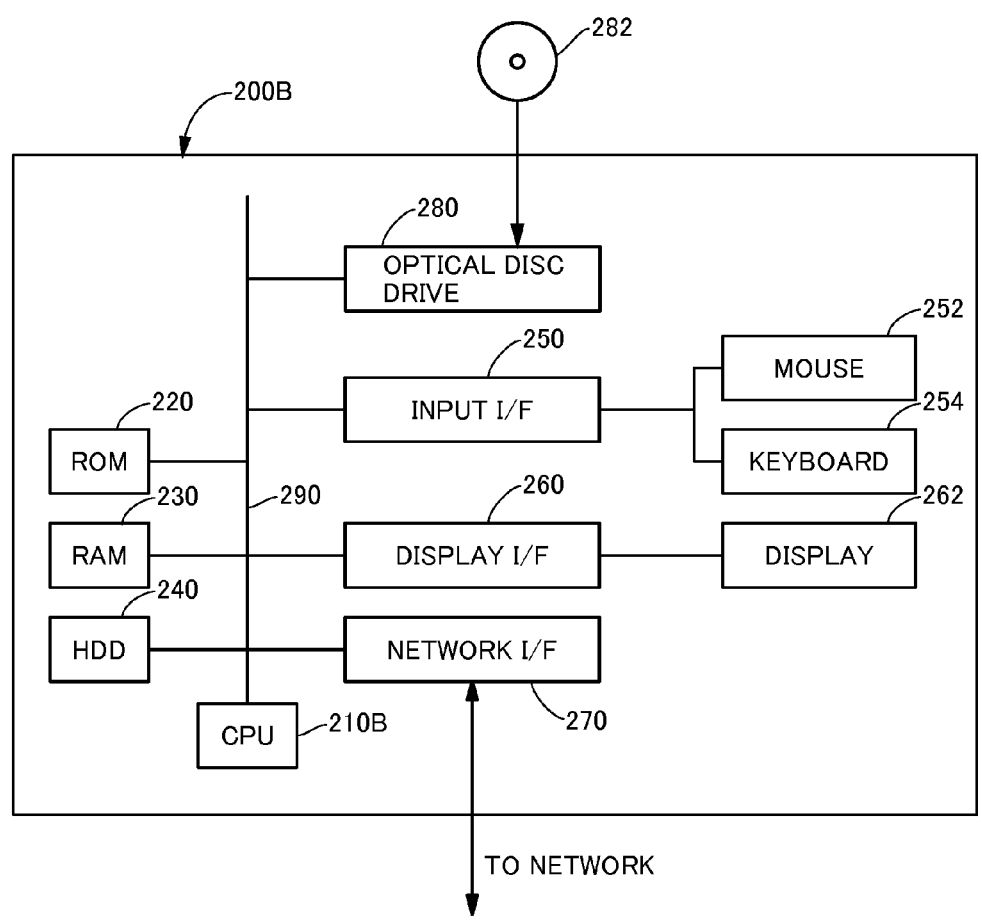
FIG. 11 is a control block diagram showing hardware configuration of a server computer of an image forming system in accordance with a third embodiment of the present invention.

Referring to FIG. 11, server computer 200B in accordance with the present embodiment includes a CPU 210B, in place of CPU 210 of the first embodiment described above. Server computer 200B including CPU 210B executes the computer program described in the following.

[Software Configuration]

Figure 12:
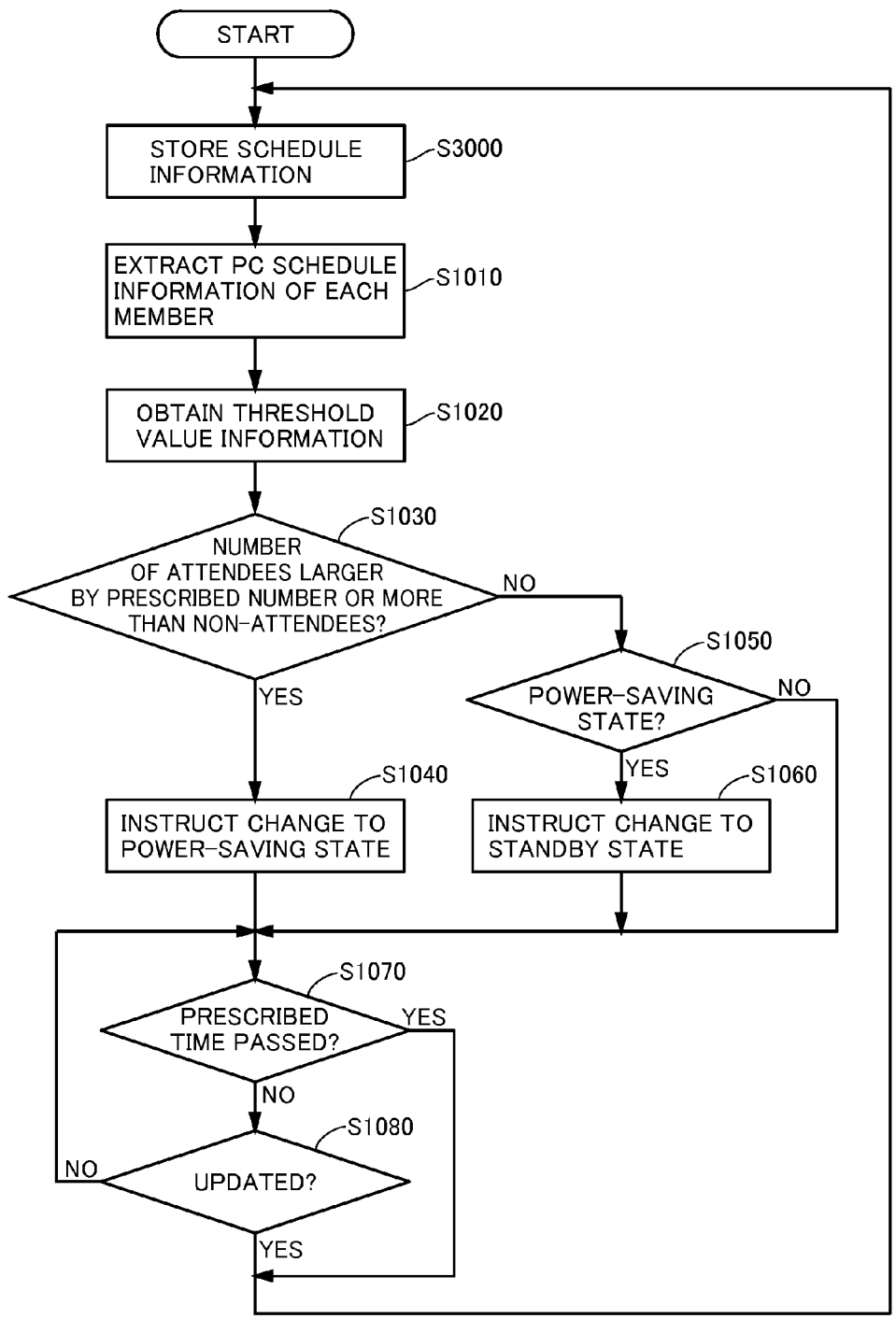
FIG. 12 is a flowchart representing a control structure of a program executed by the server computer of FIG. 11.

Referring to FIG. 12, in the image forming system (server computer 200B) in accordance with the present embodiment, the process steps except for step S3000 are the same as the process steps executed by the computer program shown in FIG. 8. Different from the first embodiment, server computer 200B stores the schedule information and, therefore, the process of obtaining the schedule information from each client computer 100 is unnecessary. Therefore, the present embodiment does not include step S1000 shown in FIG. 8. In the following, the difference will be described.

The program includes a step S3000 of storing schedule information input from each client computer 100 in hard disk drive 240 or the like of server computer 200B.

[Operation]

Referring to FIGS. 1 and 12, the image forming system in accordance with the present embodiment operates in the following manner. The operations other than the operation of obtaining the schedule information from client computer 100 are the same as those of the first embodiment. Therefore, detailed description of the same operations will not be repeated.

When the schedule information is input from each client computer 100, the input schedule information is stored in server computer 200B through network line 400 (see FIG. 1) (step S3000 of FIG. 12). The schedule information stored in server computer 200B is shared among client computers 100.

Server computer 200B extracts meeting time slot information from a specific group, from the schedule information stored in hard disk drive 240 or the like. Then, it operates in the similar manner as in the first embodiment.

[Effects of the Present Embodiment]

The image forming system in accordance with the present embodiment attains the same effects as attained by the image forming system of the first embodiment described above.

Fourth Embodiment

In the image forming system in accordance with the present embodiment, MFP 300A has a function of switching the state of operation in accordance with the operation schedule, and server computer 200C updates the operation schedule information of MFP 300A based on the meeting time slot information extracted from the schedule information.

[Overall System Configuration]

The image forming system in accordance with the present embodiment includes server computer 200C and MFP 300A in place of server computer 200 and MFP 300, respectively, of the first embodiment described above. With sever computer 200C and MFP 300A, the present embodiment is configured such that server computer 200C updates the operation schedule information of MFP 300A based on the meeting time slot information extracted from the schedule information and MFP 300A switches its state of operation to the standby state or to the power-saving state in accordance with the operation schedule, as mentioned above.

[Hardware Configuration]

In the present embodiment, the configuration of client computer 100 is the same as that of the first embodiment described above. Therefore, detailed description thereof will not be repeated.

<Server Computer 200C>

Figure 13:
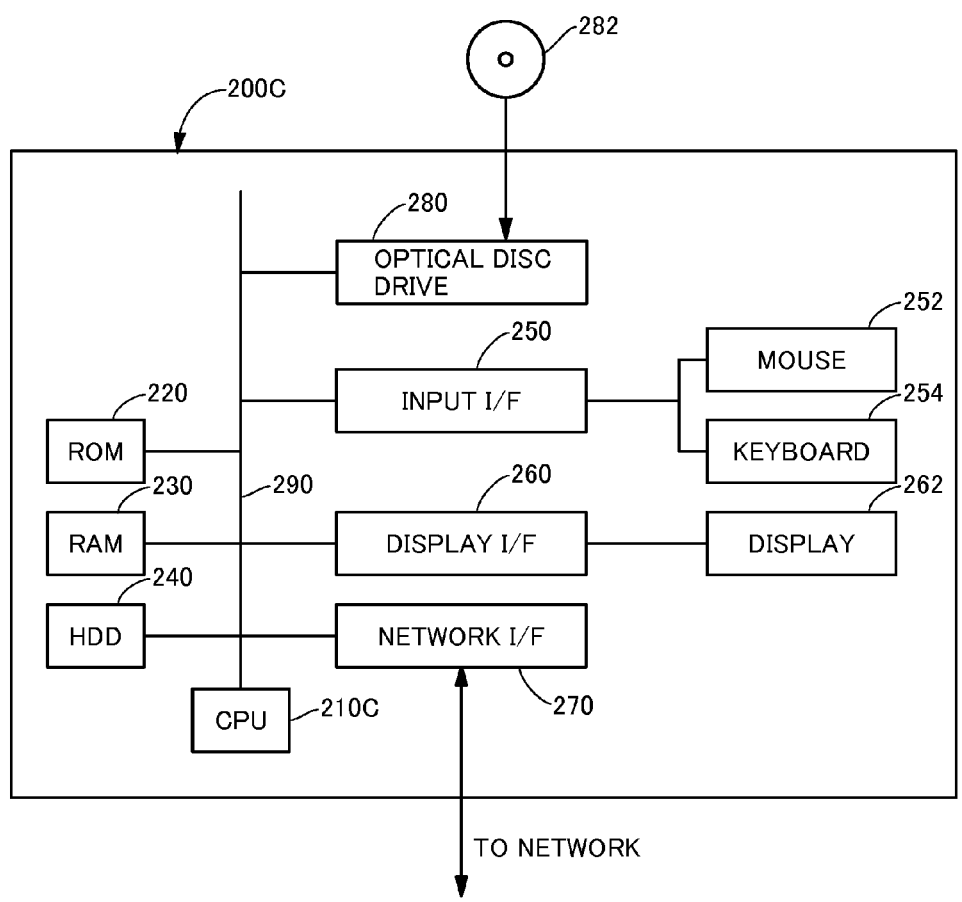
FIG. 13 is a control block diagram showing hardware configuration of a server computer of an image forming system in accordance with a fourth embodiment of the present invention.

Referring to FIG. 13, server computer 200C in accordance with the present embodiment includes a CPU 210C in place of CPU 210 of the first embodiment described above. Server computer 200C including CPU 210C executes the computer program described in the following.

<MFP 300A>

Figure 14:
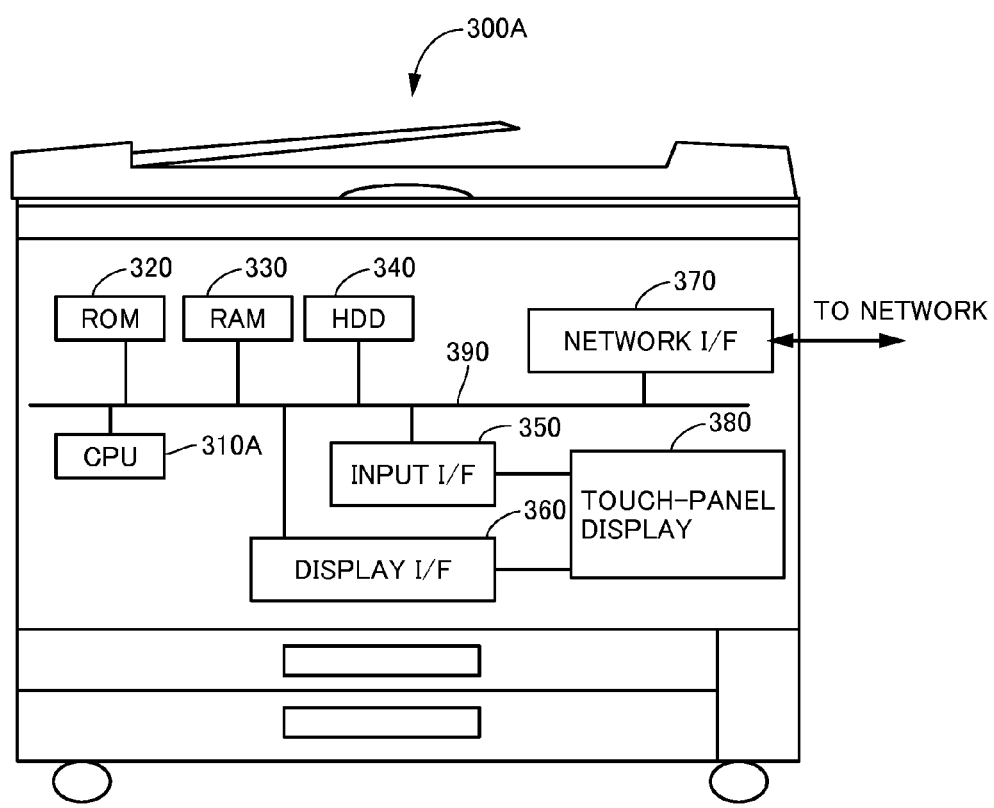
FIG. 14 is a control block diagram showing hardware configuration of an MFP of the image forming system in accordance with the fourth embodiment of the present invention.

Referring to FIG. 14, MFP 300A in accordance with the preset embodiment includes a CPU 310A in place of CPU 310 of the first embodiment described above. MFP 300A stores in hard disk drive 340 or the like operation schedule information for switching its state of operation to the standby state or to the power-saving state, and CPU 310A switches the state of operation to the standby state or to the power-saving state in accordance with the operation schedule information. The operation schedule information is updatable (rewritable), and the operation schedule information is updated (rewritten) in accordance with an instruction from server computer 200C.

The operation schedule information consists of time slot information including a first switching time of switching from the standby state to the power-saving state, and a second switching time of switching from the power-saving state to the standby state. If the first switching time is reached, MFP 300A switches its state of operation from the standby state to the power-saving state. If the second switching time is reached, MFP 300 switches its state of operation from the power-saving state to the standby state.

[Software Configuration]

Figure 15:
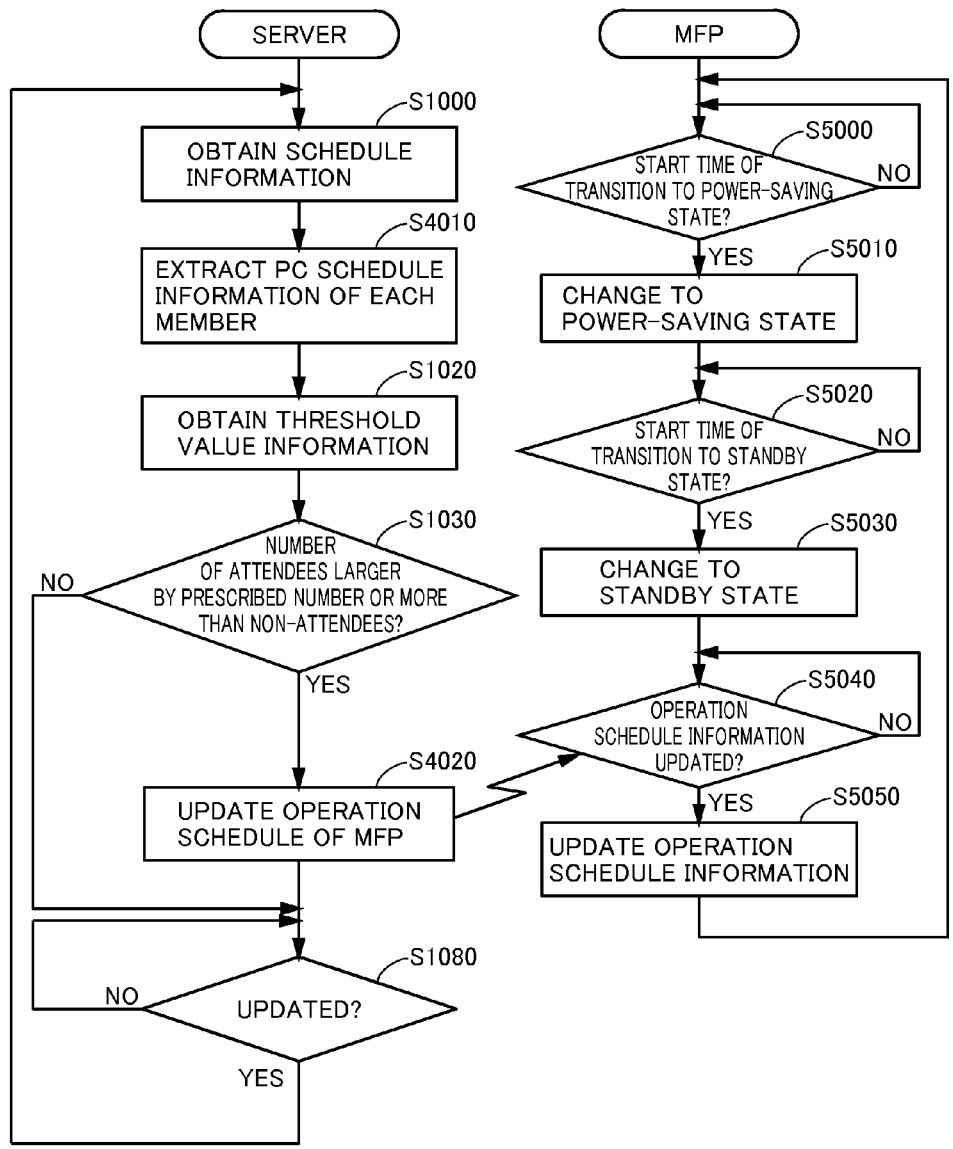
FIG. 15 is a flowchart representing a control structure of a program executed by the MFP of FIG. 14 and the server computer of FIG. 13.

Referring to FIG. 15, a control structure of a computer program executed by server computer 200C and MFP 300A in order to realize the MFP operation state switching process in the image forming system in accordance with the present embodiment will be described.

The program shown on the left side of FIG. 15 is executed by CPU 210C of server computer 200C. In server computer 200C forming the image forming system in accordance with the present embodiment, the process steps except for steps S4010 and S4020 are the same as the process steps executed by the computer program shown in FIG. 8. Different from the first embodiment, in the present embodiment, server computer 200C is configured to output an instruction to update the operation schedule information of MFP 300A and, therefore, steps S1040, S1050, S1060 and S1070 shown in FIG. 8 are not included. The present embodiment includes step S4010 in place of step S1010 of FIG. 8. In the following, difference in server computer 200C will be described.

The program includes: a step S4010, following step S1000, of extracting schedule information of members of a specific group; and a step S4020, executed if it is determined at step S1030 that, based on the meeting time slot information extracted from the schedule information, the number of attendees is larger by the prescribed number or more than the number of non-attendees among the members of the specific group, of outputting an instruction to MFP 300A to update the operation schedule information.

At step S4010, by analyzing the obtained schedule information, the meeting time slot information of members of a specific group using a certain MFP 300A is extracted from the obtained schedule information. Specifically, time slot information of a member or members who have entered a meeting in the schedule after the time point when the schedule information was obtained is extracted.

At step S4020, based on the extracted meeting time slot information, the operation schedule information of MFP 300A is rewritten. Specifically, assume, for example, that a meeting A is planned, of which number of attendees is larger by the prescribed number or more than the number of non-attendees, as shown in FIG. 4. The start time of meeting A is 10:00, and the end time is 11:30. Therefore, in order to set MFP 300A in the power-saving state during the meeting, the operation schedule information is updated such that the first switching time of switching from the standby state to the power-saving state is set to the meeting start time of 10:00, and the second switching time of switching from the power-saving state to the standby state is set to the meeting end time of 11:30.

If it is determined at step S1030 that, based on the meeting time slot information extracted from the schedule information, the number of attendees is not larger by the prescribed number or more than the number of non-attendees among the members of the specific group, that is, if meeting schedule of which number of attendees is larger by the prescribed number or more than the number of non-attendees is not entered, the control proceeds to step S1080. At step S1080, the control waits until the schedule information is updated, and if the schedule information is updated, the control returns to step S1000.

The program shown on the right side of FIG. 15 is executed by CPU 310A of MFP 300A. It is assumed that the operation schedule information is stored in advance in MFP 300A.

The program includes: a step S5000 of determining, based on the stored operation schedule information, whether or not the current time is the start time of transition to the power-saving state (first switching time), and waiting until the transition start time is reached; a step S5010, executed if it is determined at step S5000 that the current time is the switching start time, of switching the state of operation of MFP 300A from the standby state to the power-saving state; and a step S5020, following step S5010, of determining, based on the stored operation schedule information, whether or not the current time is a switching start time of transition to the standby state (second switching time), and waiting until the transition start time is reached.

The program further includes: a step S5030, executed if it is determined at step S5020 that the current time is the transition start time, of switching the state of operation of MFP 300A from the power-saving state to the standby state; a step S5040, following step S5030, of determining whether or not an instruction to update the operation schedule information has been given from server computer 200C, and waiting until the update instruction is received from server computer 200C; and a step S5050, executed if the update instruction is received from server computer 200C, of updating the stored operation schedule information and returning the control to step S5000.

Referring to FIG. 15, the image forming system in accordance with the present embodiment operates in the following manner.

Server computer 200C extracts meeting time slot information of members of a specific group from the obtained schedule information (step S4010 of FIG. 15). Server computer 200C determines, from the extracted meeting time slot information, whether or not there is time slot information of a meeting of which number of attendees is larger by the prescribed number or more than the number of non-attendees (step S1030 of FIG. 15). If there is time slot information of a meeting of which number of attendees is larger by the prescribed number or more than the number of non-attendees (YES at S1030), server computer 200C outputs an instruction to update the operation schedule information to MFP 300A (step S4020 of FIG. 15).

Thereafter, when the schedule information is updated by any member of the group (YES at step S1080), the same operation as above is repeated.

In accordance with the operation schedule information, MFP 300A switches its state of operation to the power-saving state if the start time of transition to the power-saving state is reached, and switching its operation state to the standby state if the start time of transition to the standby state is reached. When the instruction to update the operation schedule information output from server computer 200C is received (YES at step S5040), the stored operation schedule information is updated.

Specifically, when server computer 200C outputs the instruction to update the operation schedule information, it transmits the new operation schedule information corresponding to the meeting time slot information (first and second switching times) to MFP 300A. When MFP 300A receives the new operation schedule information transmitted from server computer 200C, it rewrites the stored operation schedule information with the received new operation schedule information.

Thereafter, in accordance with the updated operation schedule information, the operation state is switched to the power-saving state and to the standby state, in the manner as described above. Thus, at the meeting start time, the operation state of MFP 300A is automatically switched from the standby state to the power-saving state, and at the end time of the meeting, the state of operation of MFP 300A is automatically switched from the power-saving state to the standby state.

[Effects of the Present Embodiment]

The image forming system in accordance with the present embodiment attains the same effects as attained by the image forming system of the first embodiment described above.

[Modifications]

In the embodiments above, an example has been described in which the meeting time slot information is extracted from the schedule information and based on the extracted meeting time slot information, the state of operation of the MFP is switched from the standby state to the power-saving state. The present invention, however, is not limited to such an embodiment. The time slot information to be extracted from the schedule information may be the time slot information of a holiday, business trip, or reception of a visitor, other than the meeting. Specifically, the time slot information to be extracted from the schedule information may be any time slot in which the members will be absent.

Though an example in which members of a specific group attend the same meeting has been described in the embodiments above, the present invention is not limited to such an embodiment. The members may attend different meetings.

Referring to FIG. 16, for example, on a schedule display screen 500A, it can be seen that member A is to attend a meeting B from 13:00 to 15:00, and member B is to attend meeting B from 14:00 to 15:00 and thereafter to attend another meeting C from 15:00 to 16:00. Members C and D are to attend a meeting D from 14:00 to 16:00. As in this example, the meetings to which the members attend may be different meetings held at different times. Here, most of the members (in this example, all members) of the specific group consisting of members A to E are absent in a time slot H of 14:00 to 16:00 and, therefore, in this example, the time slot information of 14:00 to 16:00 is extracted.

If there is any member who has a schedule other than a meeting (for example, day-off or business trip) and will be absent in the same time slot, he/she should be counted not as a non-attendee of the meeting but to be a member having a schedule and will be absent in the time slot.

Though an image forming system including a server computer has been described in the embodiments above, the present invention is not limited to such embodiments. By way of example, if an MFP (image forming apparatus) is configured to have similar functions as the server computer described in the embodiments above, the image forming system not including the server computer may be realized. More specifically, a configuration may be possible in which the MFP (image forming apparatus) obtains and analyzes schedule information of users input through client computers, and based on the information obtained by analysis, the MFP (image forming apparatus) itself switches its state of operation to the power-saving state or to the standby state.

In the embodiments above, the display screen of schedule management software (schedule display screen) is only an example, and the screen may have any other configuration.

Further, the prescribed value (X) as the threshold value may be changed as appropriate. By way of example, the value (X) may be set such that if the number of attendees of a meeting is larger than the number of non-attendees, the MFP is switched to the power-saving state. Alternatively, the value (X) may be set such that if all members of the specific group attend a meeting, the MFP is switched to the power-saving state. The threshold information may be the ratio of attendees, other than the prescribed value.

As to the format of schedule information, a standard format of a scheduler may be used, or other formats may be used. An example of the format other than the standard format includes CSV format. If CSV format is used, the same effects as described above can be attained by extracting the schedule input to the PC (client computer) in the CSV format, counting a user as an attendee if he/she has a plan of meeting in a time slot, and counting a user having a blank time slot as a non-attendee.

Further, in the embodiments above, as the management table of the server computer, a table having the members using each image forming apparatus are listed is used, and the schedule is confirmed by patrolling the PC of the listed member. The present invention, however, is not limited to such an embodiment. The management table for the server computer may be a different table. For example, a table listing a group (department) using each image forming apparatus may be used. In that case, PCs of the members of each department should be managed by a separate table, so that the schedule can be confirmed by patrolling all PCs of the member belonging to the department using each image forming apparatus.

It is noted that any embodiment realized by appropriately combining the techniques disclosed above is encompassed by the technical scope of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming system, comprising: a plurality of image forming apparatuses each switchable between a standby state and a power-saving state; a plurality of information processing apparatuses each outputting a print instruction to said image forming apparatuses; and a server apparatus managing said image forming apparatuses and said information processing apparatuses; wherein each of said information processing apparatuses includes
an input device configured to input schedule information of a user;
said server apparatus includes
an analyzing device configured to obtain and analyze said schedule information,
a switching instruction output device, configured to output an instruction to switch each of said image forming apparatuses to the standby state or to the power-saving state based on information obtained as a result of analysis by said analyzing device, and
a storage device configured to store identification of each of said image forming apparatuses in association with information processing apparatuses used by users of said each of said image forming apparatuses;
wherein
said schedule information includes time slot information of a meeting to which the users of said image forming apparatuses attend;
said analyzing device includes
an extracting device configured to extract said time slot information of the meeting from said schedule information, and
a specifying device configured to specify, based on said time slot information of the meeting extracted by said extracting device, an image forming apparatus of which users decrease in number as the users attend the meeting; and
said switching instruction output device includes an instruction output device configured to output an instruction to switch said image forming apparatus specified by said specifying device to the standby state or to the power-saving state.

2. The image forming system according to claim 1, wherein said analyzing device further includes
a determining device configured to determine, based on the time slot information of the meeting extracted by said extracting device, whether or not the number of attendees of the meeting is larger by at least a prescribed number than non-attendees of the meeting in a group of users using said specified image forming apparatus; and
said instruction output device includes an output device, configured to output an instruction to switch said specified image forming apparatus from the standby state to the power-saving state, if it is determined by said determining device that the number of attendees of the meeting is larger by at least the prescribed number than non-attendees.

3. The image forming system according to claim 1, wherein said extracting device includes a meeting extracting device configured to extract time slot information of a meeting to which a plurality of users of a group of users using said specified image forming apparatus attend, from said schedule information; and said instruction output device includes an output device configured to output an instruction to switch said specified image forming apparatus to the standby state or to the power-saving state to said image forming apparatus, based on said time slot information of the meeting extracted by said meeting extracting device, such that said specified image forming apparatus is in the power-saving state in the time slot in which said meeting is being held.

4. The image forming system according to claim 1, wherein each of said information processing apparatuses further includes a schedule information storage device configured to store said schedule information input by said input device; and said analyzing device obtains said schedule information from said schedule information storage device and analyze said schedule information.

5. A server apparatus managing a plurality of image forming apparatuses and a plurality of information processing apparatuses, comprising:

an information obtaining device configured to obtain schedule information of a user input from said information processing apparatuses;

an analyzing device configured to analyze said schedule information obtained by said information obtaining device;

a switching instruction outputting device configured to output an instruction to switch each of said image forming apparatuses to a standby state or to a power-saving state to said image forming apparatus, based on information resulting from the analysis by said analyzing device; and a storage device configured to store identification of each of said image forming apparatuses in association with information processing apparatuses used by users of said each of said image forming apparatuses;

said schedule information includes time slot information of a meeting to which the users of said image forming apparatuses attend;

said analyzing device includes an extracting device configured to extract said time slot information of the meeting from said schedule information, and a specifying device configured to specify, based on said time slot information of the meeting extracted by said extracting device, an image forming apparatus of which users decrease in number as the users attend the meeting; and said switching instruction output device includes an instruction output device configured to output an instruction to switch said image forming apparatus specified by said specifying device based on said time slot information of the meeting extracted by said extracting device, to the standby state or to the power-saving state.

* * * * *